No. 673,548. Patented May 7, 1901.
J. PROEGER.
APPARATUS FOR THE MANUFACTURE OF GLASS SHEETS OR PLATES.
(Application filed May 10, 1900.)
(No Model.)
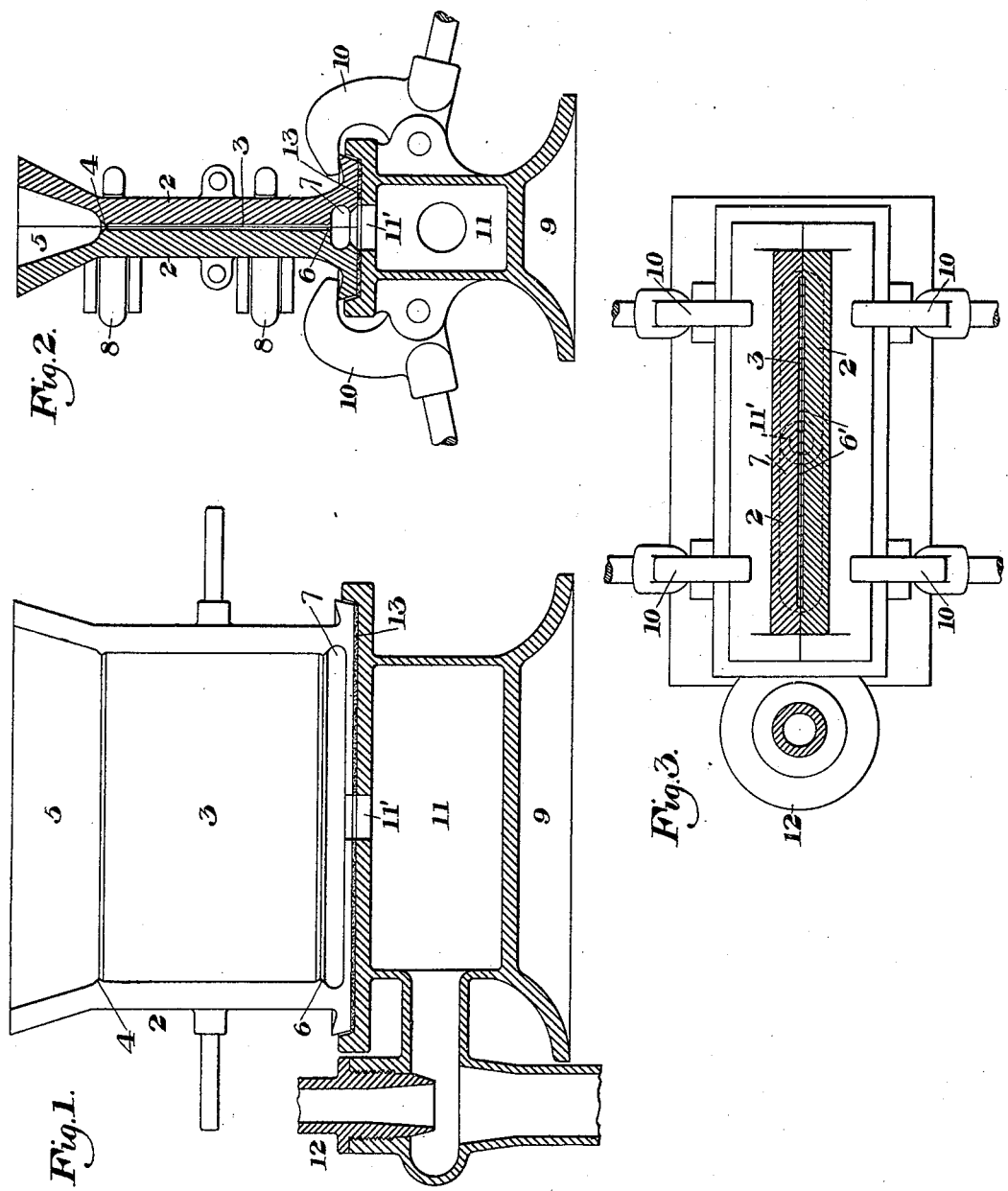
WITNESSES
INVENTOR

UNITED STATES PATENT OFFICE.

JULIUS PROEGER, OF GREENSBURG, PENNSYLVANIA, ASSIGNOR TO CHARLES NEUBERT, TRUSTEE, OF KITTANNING, PENNSYLVANIA.

APPARATUS FOR THE MANUFACTURE OF GLASS SHEETS OR PLATES.

SPECIFICATION forming part of Letters Patent No. 673,548, dated May 7, 1901.

Application filed May 10, 1900. Serial No. 16,149. (No model.)

*To all whom it may concern:*

Be it known that I, JULIUS PROEGER, of Greensburg, in the county of Westmoreland and State of Pennsylvania, have invented a new and useful Improvement in Apparatus for the Manufacture of Glass Sheets or Plates, of which the following is a full, clear, and exact description, reference being had to the accompanying drawings, forming part of this specification, in which—

Figure 1 is a longitudinal section of apparatus constructed in accordance with my invention. Fig. 2 is a vertical cross-section, and Fig. 3 is a horizontal section of a modification of the same.

My invention relates to the manufacture of sheet-glass; and it consists, broadly, in apparatus whereby the molten glass is sucked into the narrow plate-forming cavity with such extreme rapidity that surface cooling and distortion during the casting are prevented.

It also consists in novel features hereinafter described.

In the drawings, 2 2 represent the two parts of the separable mold forming a plate-forming cavity 3 of the shape and size of the sheet desired. This matrix-cavity communicates at the top through a narrow slot formed by inwardly-projecting lips 4 upon the mold-halves with an upper reservoir 5, into which the glass is poured, and at its bottom the matrix-cavity leads through a narrow opening 6 or openings 6' to a cavity 7, which extends throughout the length of the sheet. The two mold-halves are secured together by suitable clamps 8 8, preferably used at both ends thereof, and are clamped to a hollow base 9 by suitable cam-shaped clamps 10. The cavity 7 communicates with the chamber or cavity 11 in the hollow base by a port 11', and the suction is produced by any suitable apparatus, such as the injector device 12, (shown in Fig. 1,) connected to the hollow base. A packing 13, of abestos or similar material, is preferably used between the base of the mold and the recess therefor in the upper part of the base.

The operation is as follows: The mold parts being heated to a cherry-red heat, so that the molten glass shall not be chilled, are placed on the base 9 and are clamped in position, as shown. A suitable amount of molten glass is then placed in the reservoir 5, the air is exhausted from the chamber 11, and the glass will thereby be drawn quickly through the narrow slot into the mold-forming cavity. The chamber 11 is of sufficient cubical volume, so that the vacuum produced therein will suffice to enable a great amount of pressure to be exerted upon the molten glass in the reservoir and throughout the entire passage of the molten glass into the mold-cavity and to cause the very rapid flow of the glass thereinto. The outlet 6 at the bottom of the cavity being made very narrow, or, as shown in Fig. 3, consisting in a number of small holes 6', prevents any substantial passage of the glass therethrough. When the mold-cavity is filled with glass, it may be removed from the base, and being opened the ends of the sheet are cracked off along the weakened lines and the operation repeated.

The advantages of my invention will be apparent to those skilled in the art, since sheets or plates of glass or like articles of any desired form or configuration may be made directly from the molten glass, which has proved unsuccessful in apparatus heretofore known by reason of the sluggish filling of the matrix-cavity and consequent chilling and setting of the glass before the completion of the operation. By the use of my invention this is entirely removed, since the almost instantaneous filling of the cavity prevents chilling during the descent of the molten glass therein.

The faces of the mold-cavity may be provided with any desired design formed upon the glass, and many changes may be made in the form and arrangement of the mold and the suction connections without departing from my invention, since

I claim—

1. Apparatus for forming sheet or plate glass, comprising a receptacle for molten glass, a vertical plate-forming mold connecting with the bottom of the receptacle by a slot, and a suction device connected to the bottom of the mold-cavity by a narrow passage or passages; substantially as described.

2. Apparatus for forming sheet or plate glass comprising a receptacle for molten glass, a vertical plate-forming mold-cavity connected therewith, a vacuum-chamber connected with and of greater volume than said cavity, and an exhauster connected to the vacuum-chamber; substantially as described.

3. Apparatus for forming sheet or plate glass comprising a receptacle for molten glass, a vertical plate-forming mold-cavity connected therewith, and a suction device connected to the other end of the mold-cavity by a small passage or passages through which the glass will not flow to any substantial extent; substantially as described.

4. Apparatus for forming sheet or plate glass comprising a vertical mold containing a plate-forming cavity, a receptacle for molten glass at the upper end of the mold and communicating with it, a vacuum-chamber connected to the lower end of the mold-cavity by a very narrow passage or passages, and a suction device connected to the vacuum-chamber, said vacuum-chamber being of greater capacity than the plate-forming cavity; substantially as described.

5. Apparatus for forming sheet or plate glass comprising a vacuum-chamber forming a base and connected to a suction device, a vertical plate-forming mold supported upon and removable from the base, with packing between them, the vacuum-chamber being connected to the mold-cavity by a small passage or passages, and a reservoir for molten glass above the mold and communicating with the mold-cavity; substantially as described.

6. Apparatus for forming sheet or plate glass, comprising a receptacle, a vertical plate-forming mold-cavity connected therewith, and a suction device of greater capacity than the mold-cavity arranged to draw the glass from the receptacle into said cavity; substantially as described.

7. Apparatus for forming sheet or plate glass, comprising a receptacle, a vertical plate-forming mold-cavity connected therewith, a vacuum-chamber communicating with the mold-cavity and of considerable volume relatively thereto, and means for exhausting air from the vacuum-chamber; substantially as described.

8. Apparatus for forming sheet or plate glass, comprising a receptacle for molten glass, a substantially vertical plate-forming mold-cavity connecting therewith, and a suction device arranged to draw the glass from the receptacle into the mold-cavity; substantially as described.

9. Apparatus for forming sheet or plate glass, comprising a plate-forming mold having at each end passages narrower than the mold-cavity and arranged to form crack-offs, one passage connecting with a reservoir for molten glass, and a suction device connected to the other passage; substantially as described.

10. Apparatus for forming sheet or plate glass, comprising a receptacle, a plate-forming mold connected therewith, said mold being removable from its base, and a packing between the mold and its base; substantially as described.

In testimony whereof I have hereunto set my hand.

JULIUS PROEGER.

Witnesses:
G. I. HOLDSHIP,
G. B. BLEMING.